(12) United States Patent
Carper (10) Patent No.: US 10,632,643 B1
(45) Date of Patent: Apr. 28, 2020

(54) HANDHELD DOVETAIL JOINT TEMPLATE AND SAW GUIDE

(71) Applicant: Robert Carper, Arab, AL (US)

(72) Inventor: Robert Carper, Arab, AL (US)

(*) Notice: Subject to any disclaimer, the term of this patent is extended or adjusted under 35 U.S.C. 154(b) by 0 days.

(21) Appl. No.: 16/397,239

(22) Filed: Apr. 29, 2019

(51) Int. Cl.
  *B27F 1/12* (2006.01)
  *B26B 29/06* (2006.01)

(52) U.S. Cl.
  CPC .......... *B27F 1/12* (2013.01); *B26B 29/06* (2013.01)

(58) Field of Classification Search
  CPC ...... B27F 1/00; B27F 1/08; B27F 1/10; B27F 1/12; B27F 1/14; B27F 1/16; B27F 5/00; B27F 5/02; B27G 23/00; B23D 51/025; B26B 29/06; B27B 11/02
  See application file for complete search history.

(56) References Cited

U.S. PATENT DOCUMENTS

| | | | |
|---|---|---|---|
| 592,139 | A | 10/1897 | Griffith |
| 1,109,952 | A | 9/1914 | Armstrong |
| 2,906,303 | A | 9/1959 | Abel |
| 4,632,159 | A | 12/1986 | Glasgo |
| 5,687,628 | A | 11/1997 | Liao |
| 6,607,016 | B2 | 8/2003 | Jones |
| 7,249,552 | B2 | 7/2007 | Hines |
| 8,479,630 | B2 | 7/2013 | Osbourne |
| 2018/0065272 | A1* | 3/2018 | Saylor ............... B27F 1/16 |
| 2019/0262918 | A1* | 8/2019 | DeSantis .......... B26B 29/06 |

* cited by examiner

*Primary Examiner* — Matthew Katcoff
(74) *Attorney, Agent, or Firm* — Cynthia R. Wright (57) ABSTRACT

The Handheld Dovetail Joint Template and Saw Guide is a handheld jig device utilized to mark and/or cut pin and tail cuts forming a dovetail joint. The jig device includes a base with two angled, planar surfaces-a pin surface and a tail surface-opposite each other. A user holds the pin surface along the top edge of the pin board and marks and/or cuts the lengths of the pin portion of the dovetail joint. Next, the user places the tail surface of the base along the top edge of the tail board, aligns a retractable arm against the length of a pin cut, and marks the tail board along the angled, planar surface of the tail surface. Once all pin and tail cuts are formed in this manner, the pin and tail boards are fitted together.

5 Claims, 11 Drawing Sheets

HANDHELD DOVETAIL JOINT TEMPLATE AND SAW GUIDE

CROSS-REFERENCE TO RELATED APPLICATIONS

This application does not claim priority to any patent application.

DISCLOSURE REGARDING PRIOR DISCLOSURES BY THE INVENTOR OR A JOINT INVENTOR

The inventor has not disclosed this invention prior to the filing of this non provisional application.

BACKGROUND OF THE INVENTION

(1) Field of the Invention

This device is a handheld guide for marking wood, or other boards, so that a dovetail joint may be formed between the two boards between the sides and ends. This device allows a user to mark both the pin board and the tail board so that a user may take a chisel, or other instrument, and remove the sections of wood so marked forming an extremely tight dovetail joint is formed.

(2) Disclosure of the Prior Art

A number of devices are disclosed in the prior art for forming dovetail joints where two boards are joined. Miter boxes, such as the miter box disclosed in Griffith (U.S. Pat. No. 592,139), are available in hardware stores and online. Miter boxes allow a user to insert one or two boards so that the boards may be cut to form pin and tail boards, which are joined forming a dovetail joint. Although miter boxes allow a user to cut both pins and tails, it is difficult for a user to line the boards up inside the miter box so that the ends of both the pin and tail boards are cut throughout their lengths. And, there is not a reliable way for matching a particular pin cut to a particular tail cut, which leads to erroneous cuts and wasted time and boards. Miter boxes can be cumbersome and difficult to cut, especially for narrow boards with just a small number of dovetail joints.

A number of handheld devices, or jigs, are available that allow a user to position a clamp for use with a saw for hand cutting tails and pins on the ends of boards. Glasgo (U.S. Pat. No. 4,632,159) discloses a clamping dovetail device that includes angled saw guides that are repositioned along a board by either rotating them about the end of a central template or inverting the entire clamping device. While the device of Glasgo allows a user to create both pin and tail cuts, the device is difficult to use because it must be aligned, clamped, unclamped, and realigned and reclamped numerous times while cutting a single board. Also, this device does not allow a user to mate a pin cut to a tail cut. If the pin cut is not correctly spaced relative to a tail cut, the pin cut may not mate with the tail, and a dovetail joint will not be formed.

Jones (U.S. Pat. No. 6,607,016 B2) discloses a clamping device that may be repositioned along a board to cut both pin and tail cuts. This device includes at least one magnet. The magnet helps engage the saw blade during hand cuts. But, this device must be clamped, unclamped, and reclamped numerous times along a single board to create dovetail cuts. And, this device does not mate, or match, a particular pin cut to a particular tail cut. The inability to mate a pin cut to a tail cut may cause a user to erroneously place pin and tail cuts along a board preventing them from mating with each other and forming a dovetail joint.

A device is needed that can be fully handheld without clamps so that a user can quickly and easily move from pin to tail cuts and easily move along a single board. And, a device is needed that can mate a particular pin cut to a tail cut so that the pin and tail cuts will be correctly positioned along a board reducing erroneous cuts and wasted boards.

BRIEF SUMMARY OF THE INVENTION

This device comprises a handheld jig device that includes angled sides that serve as a template allowing a user to mark and cut both pin and tail cuts. The jig includes magnets positioned near the angled sides that serve as a saw guide engaging and guiding a saw blade while a user hand saws each pin and tail cut. This device includes an arm that may be manipulated by a user to mate each pin cut to a tail cut so that the pins and tails are formed at the correct position of each board so that dovetail joints are correctly formed.

BRIEF DESCRIPTION OF THE DRAWINGS

The invention is described in detail below with reference to the appended drawings. FIGS. 1 through 22 depict the Handheld Dovetail Joint Template and Saw Guide. In the Figures:

FIG. 21 depicts the pin board aligned to fit with the tail board, while

DETAILED DESCRIPTION OF THE INVENTION

While this invention is susceptible of embodiment in many different forms, there are shown in the drawings and will herein be described in detail, several embodiments with the understanding that the present disclosure should be considered as an exemplification of the principles of the invention and is not intended to limit the invention to the embodiments so illustrated. Further, to the extent that any numerical values or other specifics of materials, etc., are provided herein, they are to be construed as exemplifications of the inventions herein, and the inventions are not to be considered as limited thereto.

The following description and drawings are illustrative and are not to be construed as limiting. Numerous specific details are described to provide a thorough understanding of the disclosure. However, in certain instances, well-known or conventional details are not described in order to avoid obscuring the description. References to one, or an embodiment in the present disclosure, can be, but not necessarily, references to the same embodiment; and, such references mean at least one of the embodiments.

Reference in this specification to "one embodiment' or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same term can be said in more than one way.

Consequently, alternative language and synonyms may be used for any one or more of the terms discussed herein, or is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

Figure 1:
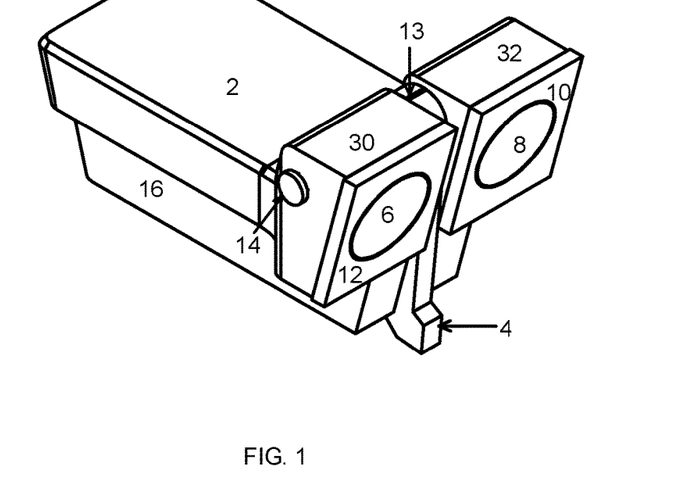
FIG. 1 depicts an angled side and top view of the tail template of the device, or jig.

FIG. 1 depicts an angled, side and top view of the tail template of the device, or jig. The hand grip includes base 16 and grip 2. Base 16 and grip 2 may be formed in any shape that aids a user in gripping the device. The head of the device includes template heads 30 and 32. Template head 30 includes template guide 12, and template head 32 includes template guide 10. Template guides 10 and 12 are angled, planar surfaces utilized to draw a line and cut a board at the correct angle, wherein the line drawn from the angled, planar surface is used to mark a both lengths of a tail cut. Magnets 6 and 8 are embedded into template heads 30 and 32, respectively. Pin 14 secures arm 4 into the device. Arm 4 reversibly rotates about pin 14. Pin 14 is enclosed within pin cover 13, that protects pin 14.

Figure 2:
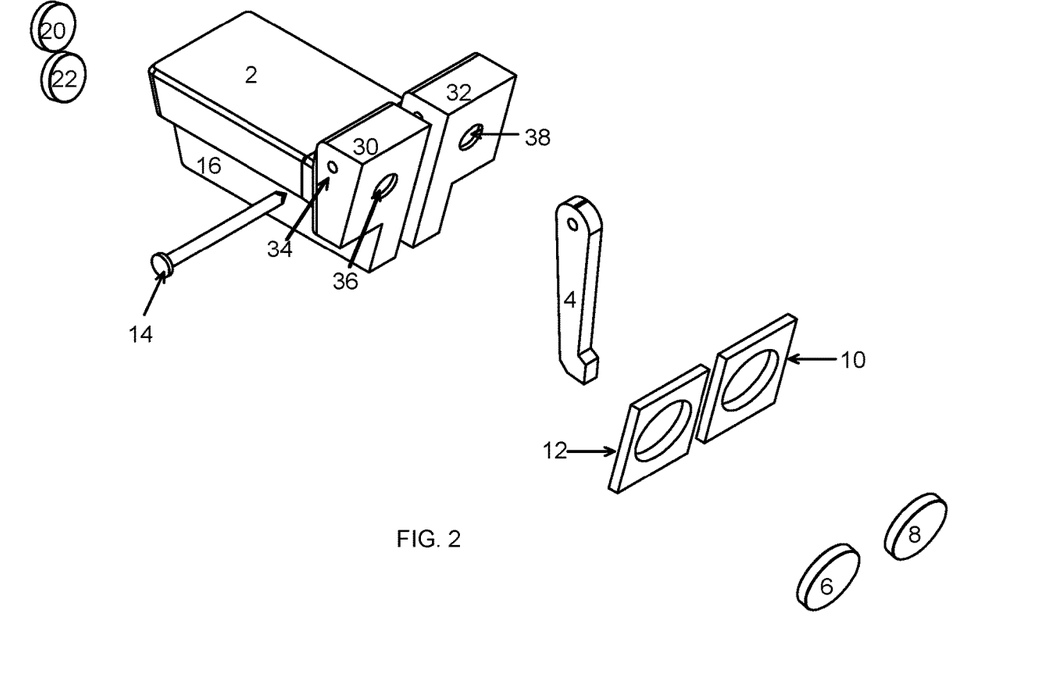
FIG. 2 depicts an exploded view of FIG. 1.

FIG. 2 depicts an exploded view of FIG. 1. Magnets 20 and 22 are coupled to the pin template (shown in FIG. 3), while magnets 6 and 8 are positioned within openings formed into template guides 12 and 10, respectively. Openings 36 and 38 may be used to attach magnets 6 and 8, respectively, to template heads 30 and 32, respectively. Template heads 30 and 32 are angled, planar surfaces used to mark and/or cut the lengths of a pin cut. Arm 4 is shown with arm opening 24. Pin 14 is shown inserted through template opening 34 and arm opening 24. A user may manipulate arm 4 so that it rotates about pin 14 allowing it to move relative to template heads 30 and 32. Grip 2 and base 16 may be flat so that the device will rest level against the end of a board.

Figure 3:
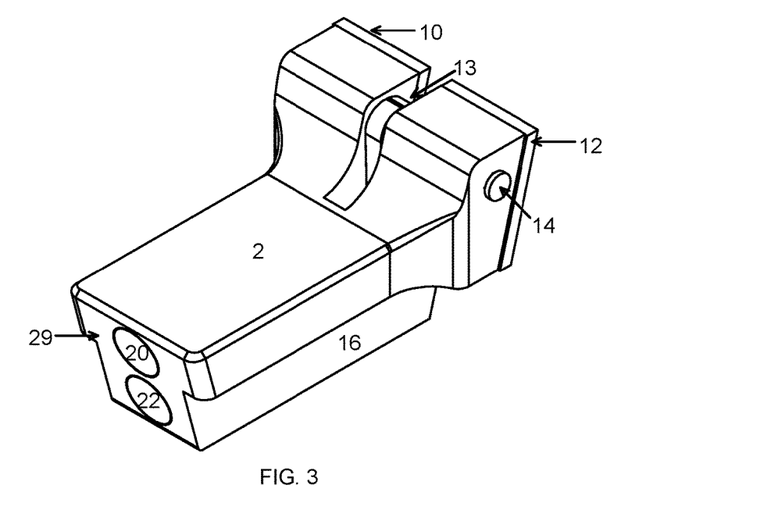
FIG. 3 depicts an angled, side and top view of the pin template of the device.
Figure 4:
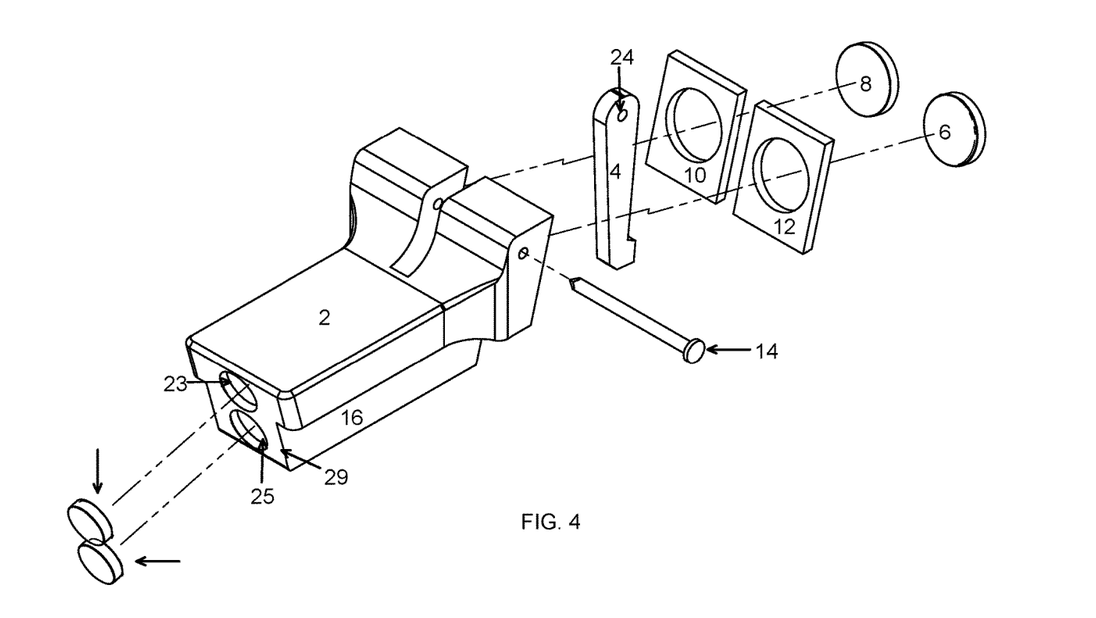
FIG. 4 shows an exploded view of FIG. 3.

An angled, end and side and top view of the pin template of the device is shown in FIG. 3. Pin template 29 may include magnets 20 and 22. Magnets 20 and 22 serve as saw guides engaging the saw while a user is sawing a pin cut. Magnets 20 and 22 reduce vibration in the saw promoting a smooth cut. Magnets 20 and 22 are positioned so that magnet 22 is closer to base 16, and magnet 20 is closer to grip 2. Pin cover 13 covers pin 14. The thickness of both template guides 10 and 12 is shown. FIG. 4 shows an exploded view of FIG. 3.

Magnets 20 and 22 are shown removed from openings 23 and 25, respectively. Openings 23 and 25 are formed in pin template 29. Pin template 29 is the angle that pin cuts may be formed from. Both base 16 and grip 2 have a flat surface so that they can be positioned upon a flat board. Pin 14 may be inserted through arm 4 at arm opening 24. Template guides 10 and 12 include openings that magnets 8 and 6, respectively, rest within. Template guides 10 and 12 are positioned onto the device at an angle, which is the angle that tail cuts may be drawn and/or cut.

Figure 5:
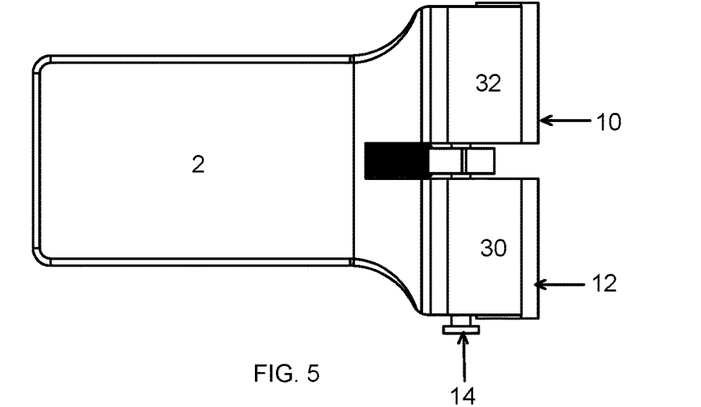
FIG. 5 illustrates a top view of the device.
Figure 6:
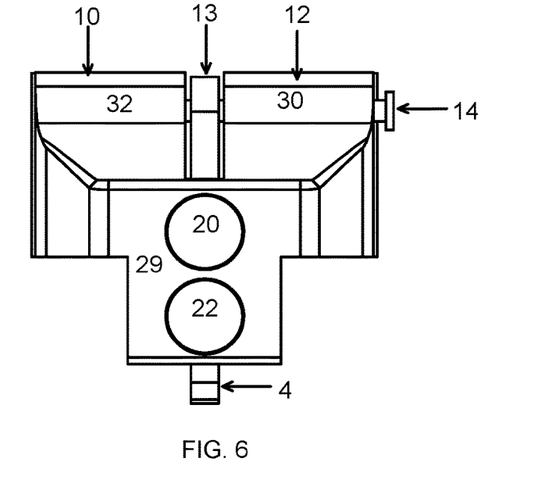
FIG. 6 illustrates a view of the pin template end of the device.
Figure 7:
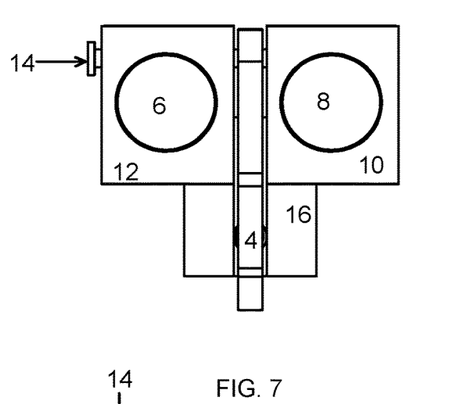
FIG. 7 is a view of the tail template of the device.
Figure 8:
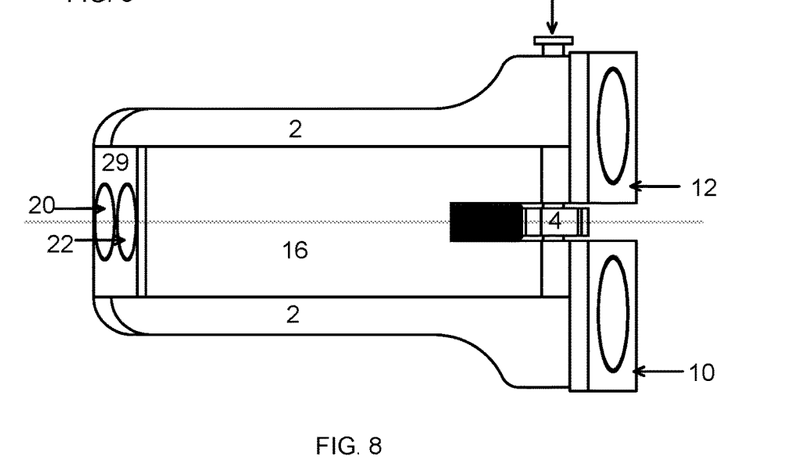
FIG. 8 depicts the bottom of the device.

A top view of the device is illustrated in FIG. 5. Grip 2 is coupled to template heads 30 and 32, which are coupled to template guides 12 and 10, respectively. Pin 14 is also shown. FIG. 6 illustrates a view of the pin template end of the device. Pin template 29 is formed so that it maintains an angle that is the angle that a board may be cut to create a pin of a dovetail joint. Magnets 20 and 22 are positioned so that they engage with a saw while a pin cut is being made by a user with a hand saw. Arm 4 is shown protruding beneath the device. Template guides 10 and 12 are coupled to template heads 32 and 30, respectively. A view of the tail template of the device is shown in FIG. 7. Magnets 6 and 8 are positioned on template guides 12 and 10, respectively, so that they engage with a hand saw while a user is cutting tail cuts to form a dovetail joint. Arm 4 is shown protruding beneath base 16. Pin 14 is shown. A bottom view of the device is depicted in FIG. 8. Pin template 29 includes magnets 20 and 22. Arm 4 is shown nested within base 16, grip 2, and template guides 12 and 10. Pin 14 is also shown.

Figure 9:
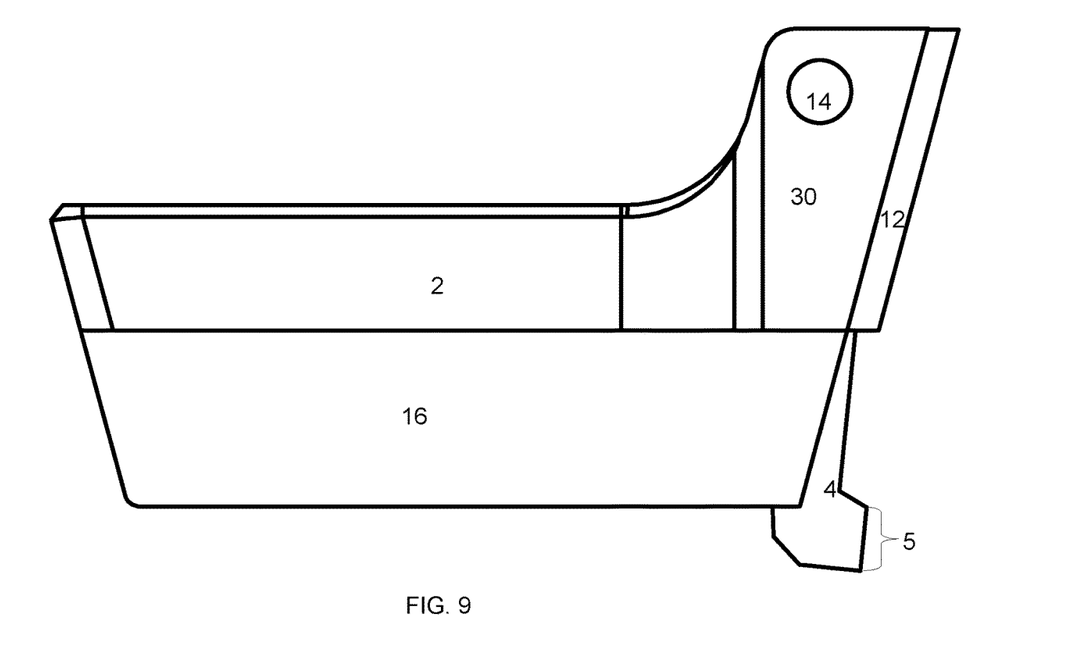
FIG. 9 is a side view of the device.
Figure 10:
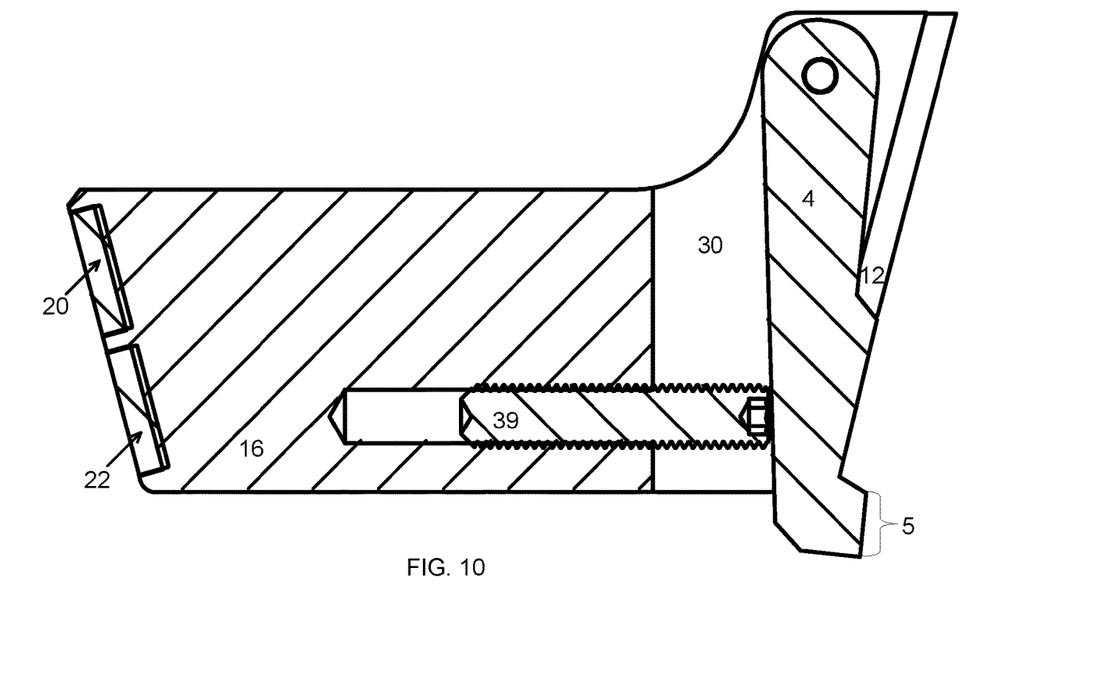
FIG. 10 depicts a mid-sectional view of FIG. 9.

FIG. 9 is a side view of the jig device. Base 16 includes a flat length that may be positioned along a board while marking and cutting pins and/or tails. Grip 2 may be flat or shaped to better fit a user's hand as shown in this figure. Arm 4 is nestled within template head 30, base 16, and template guide 12. Arm 4 may include arm measuring projection 5, which has a flat end. Arm measuring projection 5 is used to mate the tail cuts to the pin cuts when cutting the tail board (shown in FIG. 13). FIG. 10 is a mid-sectional view of FIG. 9. Magnets 20 and 22 are embedded into base 16 (not shown). Template head 30 is secured onto base 16. Arm 4 is positioned relative to base 16 via screw 39. When screw 39 is fully embedded into base 16, arm 4 is positioned along base 16. When screw 39 is unscrewed so that screw 39 sticks outside of base 16, arm 4 is positioned so that it is no longer aligned against base 16. This allows the face or location of the tail cuts to be adjusted by a user. Arm 4 includes arm measuring projection 5. Template guide 12 covers template head 30.

Figure 11:
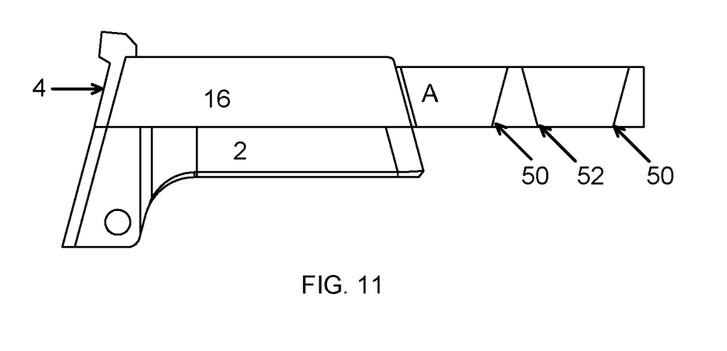
FIG. 11 illustrates a top view of the device while a user is marking and/or cutting a pin cut.
Figure 12:
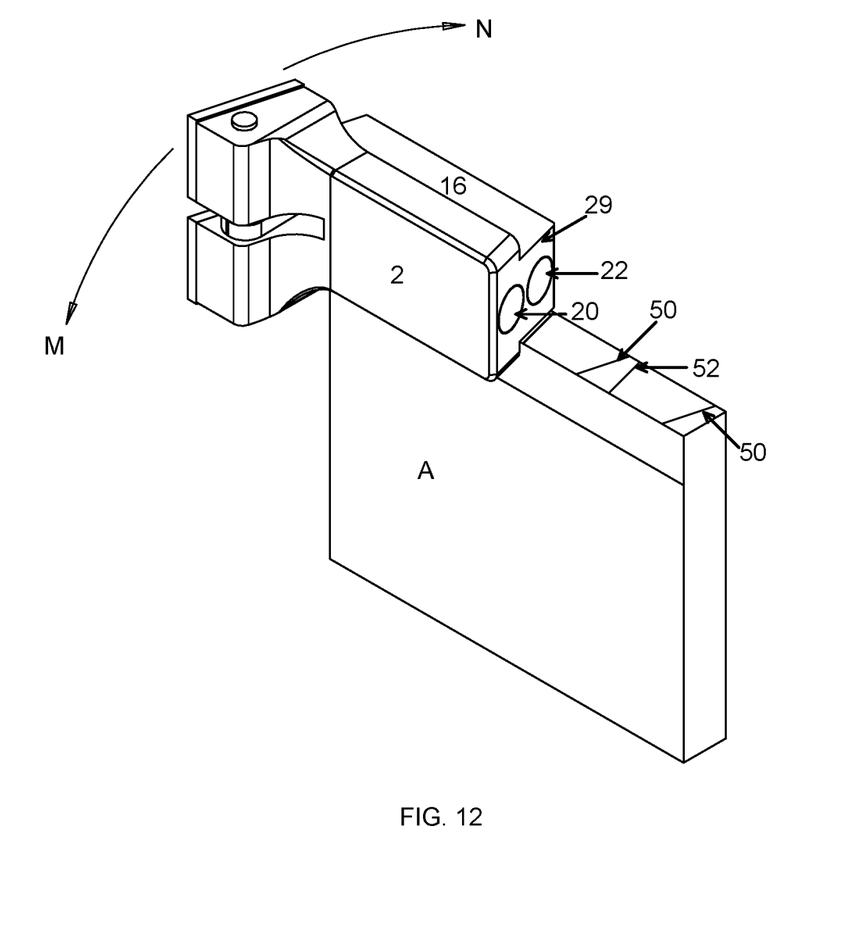
FIG. 12 illustrates a side view of FIG. 11.

FIG. 11 illustrates a top view of the device while a user marking or cutting a pin cut. The side of base 16 is placed along the end of pin board A. Grip 2 may rest along the face of pin board A. Arm 4 is retracted within the device. The place of the device in this position along pin board A may be used as a template to draw and saw pin cut lines 52. FIG. 12 illustrates a side view of FIG. 11. The side of base 16 is placed on the end of tail board A. Magnets 20 and 22 are positioned to engage a hand saw while a user is cutting lines 52. Lines 52 are drawn by tracing the end of pin template 29 onto the end of pin board A. The jig device may be rotated by a user along its center point in the "M" or "N" direction 180 degrees to create a template for drawing or sawing pin cuts 50.

Figure 13:
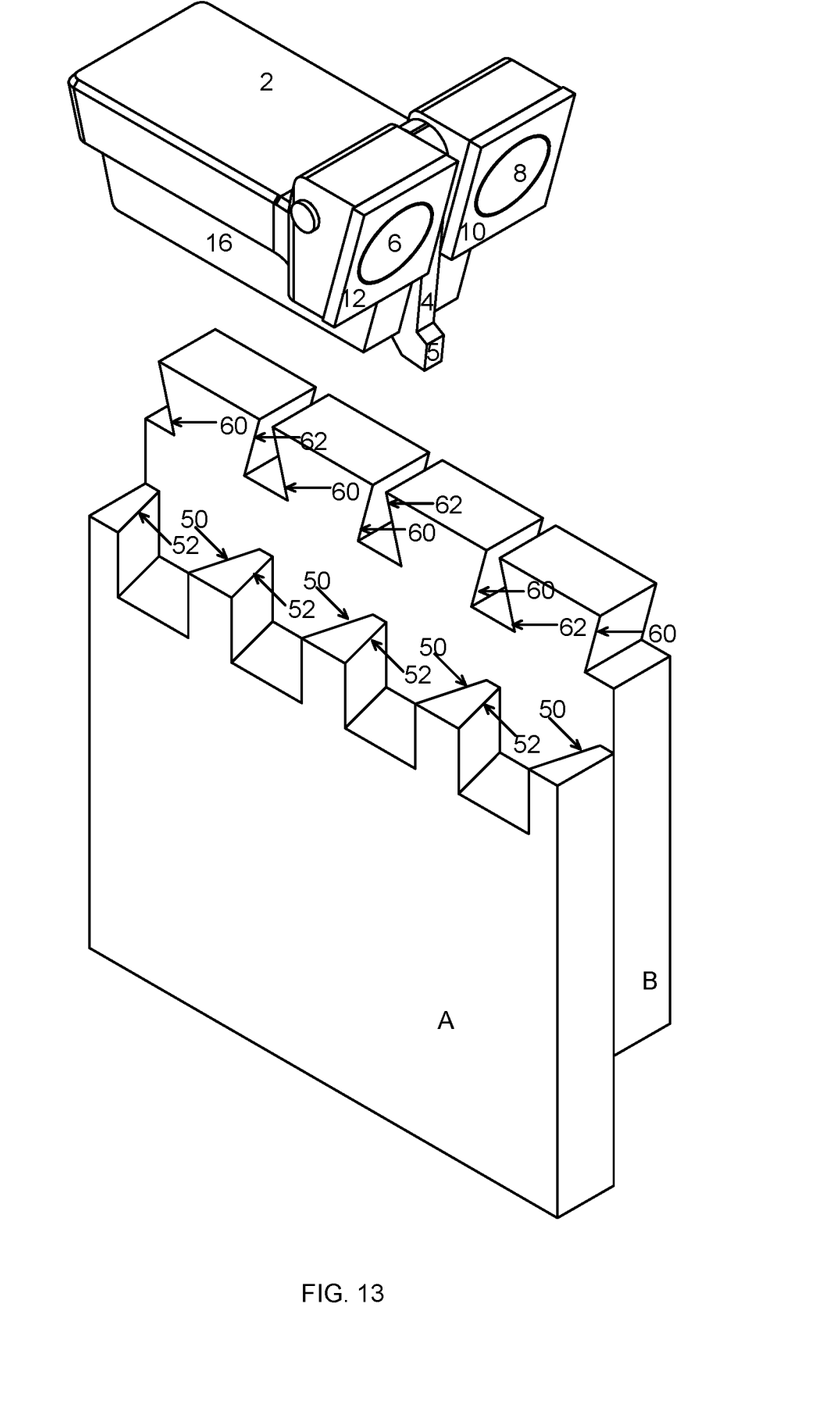
FIG. 13 illustrates the device as depicted in FIG. 1 after making tail cuts.

FIG. 13 illustrates the device as depicted in FIG. 1 after marking and/or cutting tails. All pin cuts may be formed in pin board A before any tail cuts are formed in tail board B. Pin board A and tail board B are shown is the position utilized to form the tail cuts. Pin board A includes pins formed from pin cut lines 50 and 52 through the end of pin board A. A user saws pin cut line 50 and its corresponding pin cut line 52, and then chisels out the wood between the two cut lines forming a pin. The jig device is shown positioned above pin board A and tail board B in the orientation utilized to form each of the tail cut lines 62. Tail cuts are formed into tail board B via cuts along tail cut lines 60 and 62. Upon sawing a tail cut line 60 and its corresponding tail cut line 62, a user chisels out the wood within tail cut lines 60 and 62 forming a tail.

Figure 14:
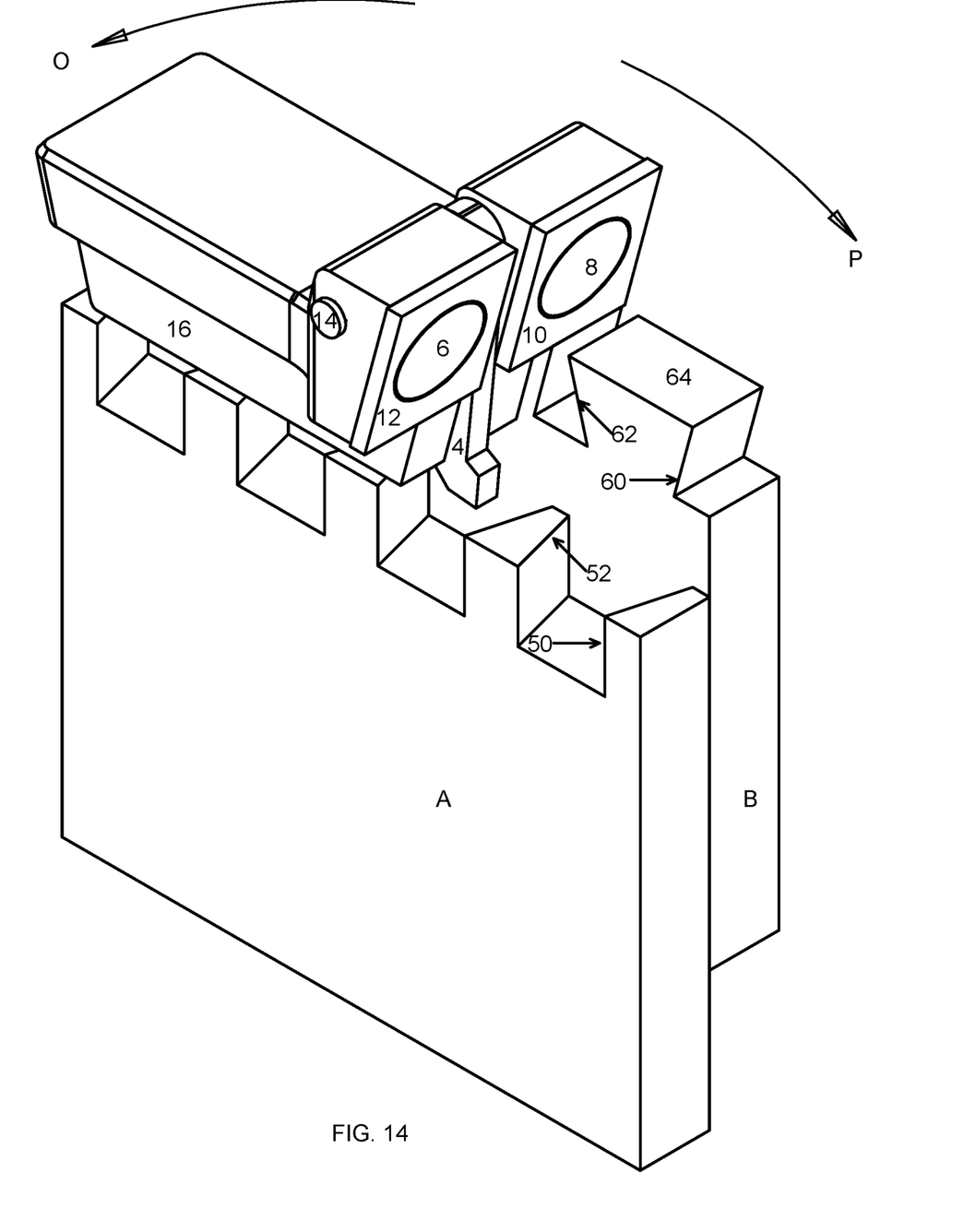
FIG. 14 illustrates an angled side view of the device as depicted in FIG. 1 aligned on the tail board so that the tail cut line may be drawn and cut.

FIG. 14 illustrates an angled side view of the jig device aligned on tail board B so that tail cut line 60 may be drawn and/or cut. Magnets 6 and 8 are positioned to engage a metal hand saw blade while tail cut line 60 is being cut. Base 16 is positioned on top of the end of tail board B. Arm 4 is rotated along pin 14 so that the flat end of arm measuring projection 5 is pushed against pin cut line 50 of pin board A. In order to draw or saw tail cut line 60, the jig device must be rotated 180 degrees in either direction "O" or direction "P". If the jig device is rotated 180 degrees in the "O" direction, then arm 4 is rotated and the flat end of arm measuring projection 5 is placed against a cut line 52 downstream and a tail cut line 60 is drawn and/or cut using template guides 12 and 10. The tail line 62 cut corresponds to the tail cut line 60 previously cut.

Figure 15:
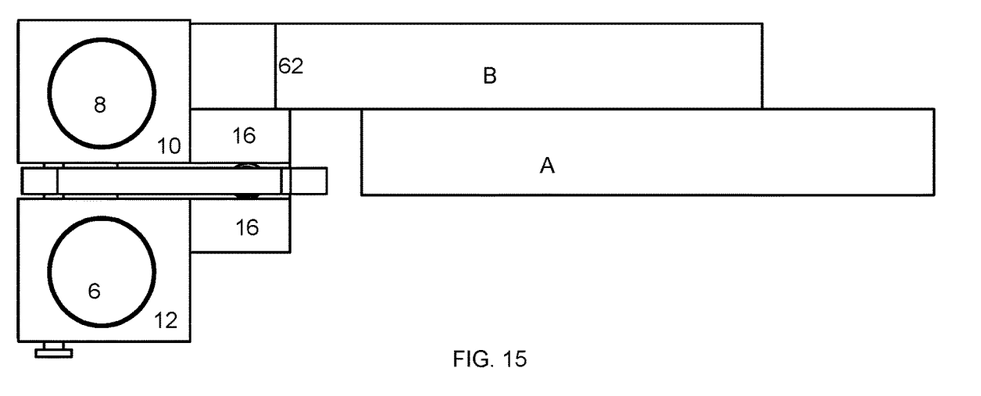
FIG. 15 depicts a end view of FIG. 14.

FIG. 15 depicts a top view of FIG. 14 while a tail is being drawn or cut. Note that pin board A is placed so that the end of pin board A is positioned so that the outer end extends beyond the end of tail board B. The jig device is placed so that arm 4, magnets 6 and 8, and template guides 10 and 12 are shown. Note base tail line 62 has been marked and/or cut and the jig device is being moved by a user to mark and/or cut tail cut line 60 (not shown).

Figure 16:
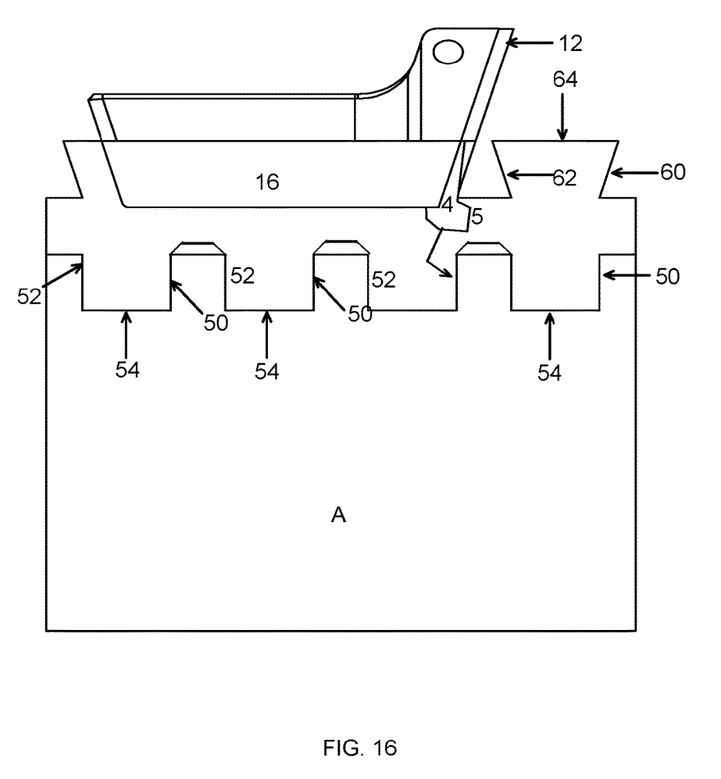
FIG. 16 depicts a side view of FIG. 14.

FIG. 16 depicts a side view of FIG. 14. Base 16 is positioned on top of the end of tail board B. The flat end of arm measuring projection 5 of arm 4 is positioned along pin cut line 50. Template guide 12 is utilized to draw or saw tail cut line 60 forming a tail in tail board B (not shown in this figure). The jig device is repositioned along each pin cut line 50 to serve as a template for each tail cut line 60 in tail board B. The jig device is rotated from end-to-end so that arm measuring projection 5 may be pressed against each pin cut line 52 to serve as a template for each tail cut line 62 (not shown).

Figure 17:
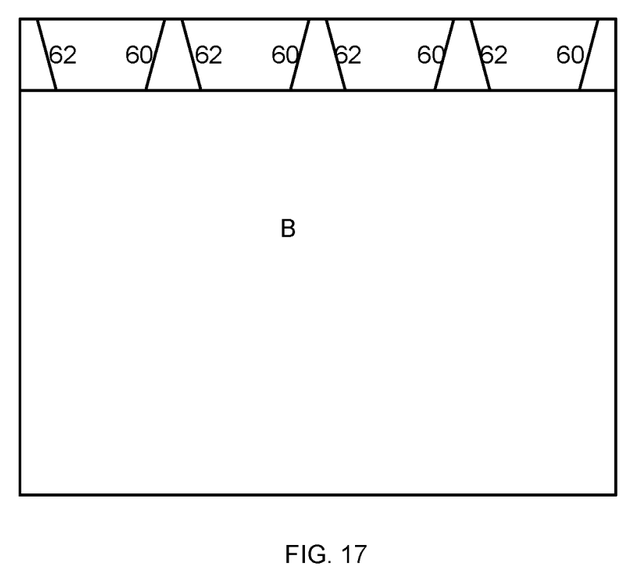
FIG. 17 shows a front view of the tail cuts before the tails are formed.
Figure 18:
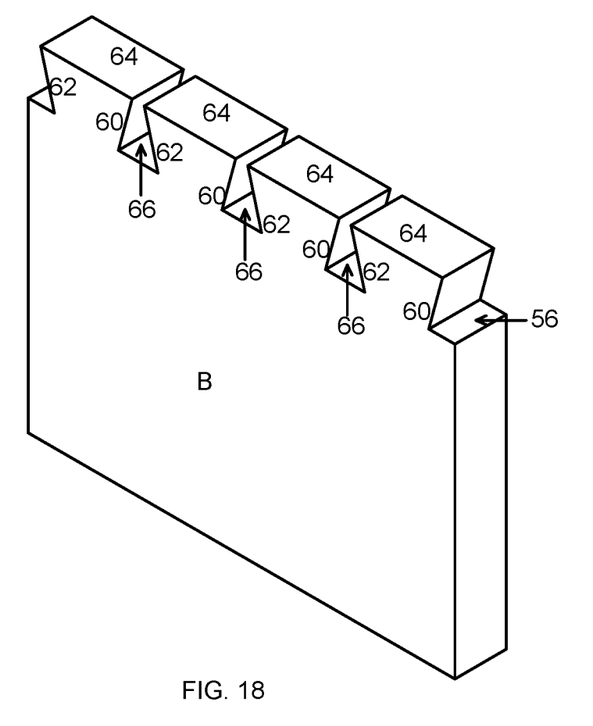
FIG. 18 depicts an oblique view of the tail board of FIG. 17, which was formed during the process depicted in FIG. 14, once the excess board material is removed from the tail board.

FIG. 17 shows a front view of tail cut lines 60 and 62 before the tails are formed. The tails are formed when a user using a chisel or other tool removes the wood between tail cut lines 60 and 62 forming an opening as shown in FIG. 18. Board end 64 is the end of the board not chiseled out of tail board B that forms a corner of the dovetail joint.

Figure 19:
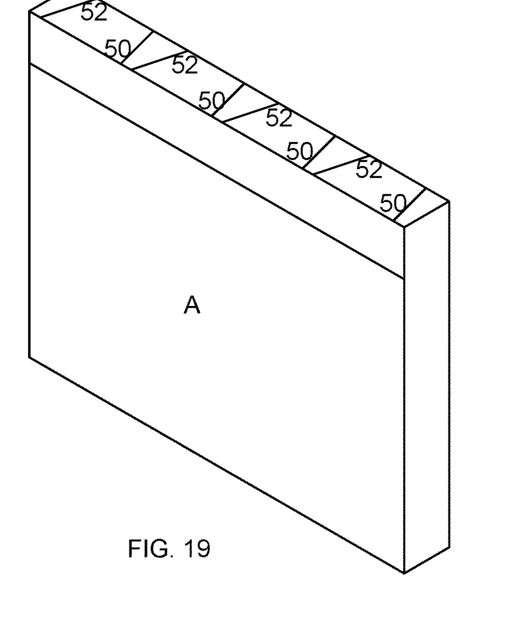
FIG. 19 depicts a side, angled view of a pin board wherein the pin cut lines were formed via FIG. 9 prior to the removal of excess board material.
Figure 20:
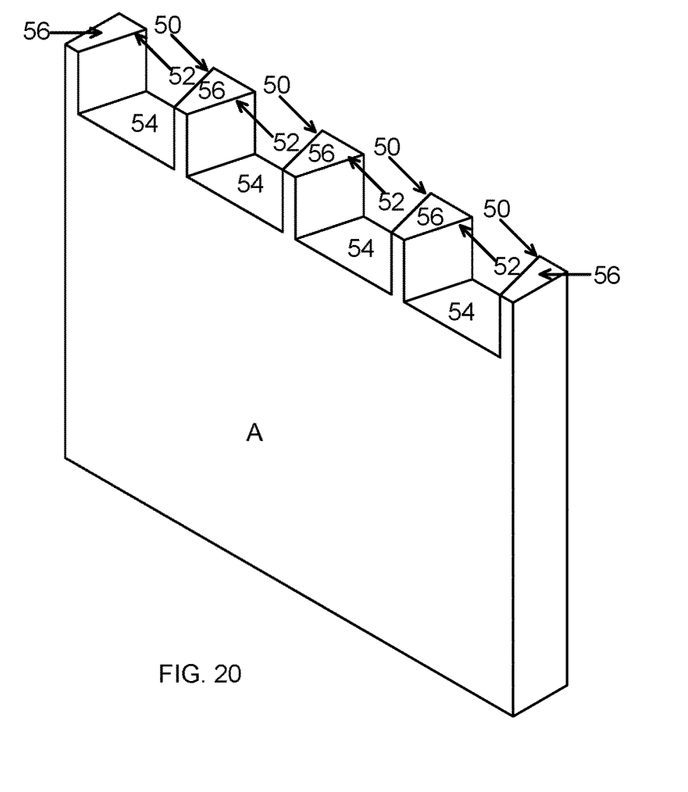
FIG. 20 depicts the pin board of FIG. 19 with the excess material removed.

FIG. 19 depicts a side, angled view of pin board A with pin cut lines 50 and 52 drawn onto and/or cut into the board. A user utilizing a chisel or other tool removes the wood in pin board A from a cut line 52 to a cut line 50 forming a pin. Board end 56 is the end of pin board A remaining after a user has removed wood between the pins. Board end 56 forms a corner of the dovetail join. Board end 64 fits within pin straight end 54 forming the dovetail joint.

Figure 21:
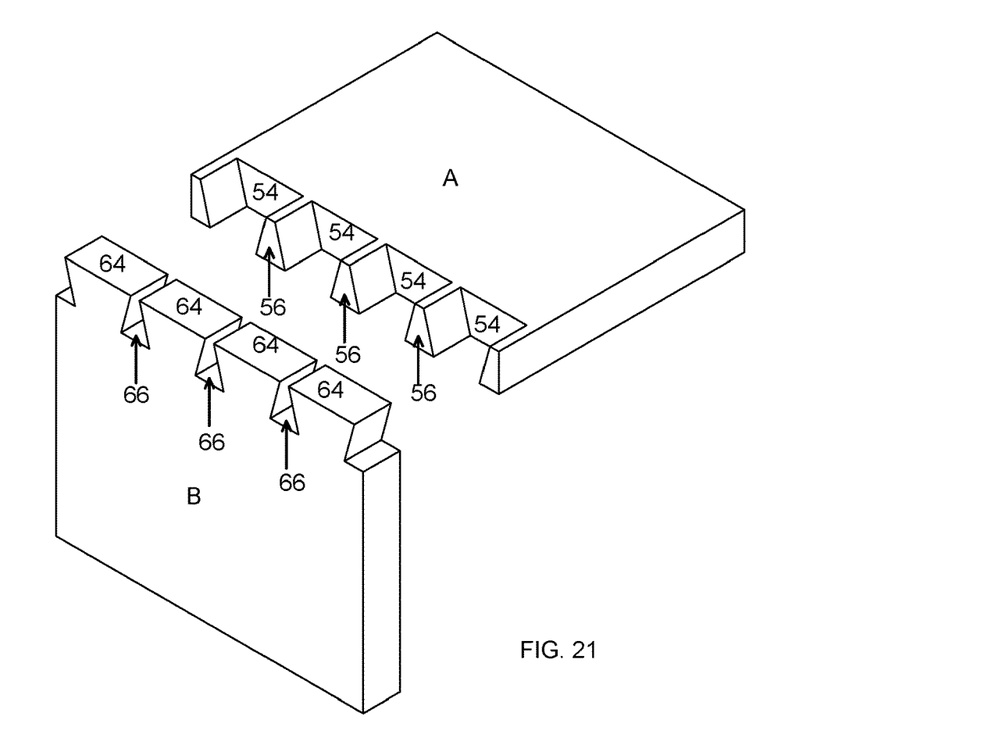
Figure 22:
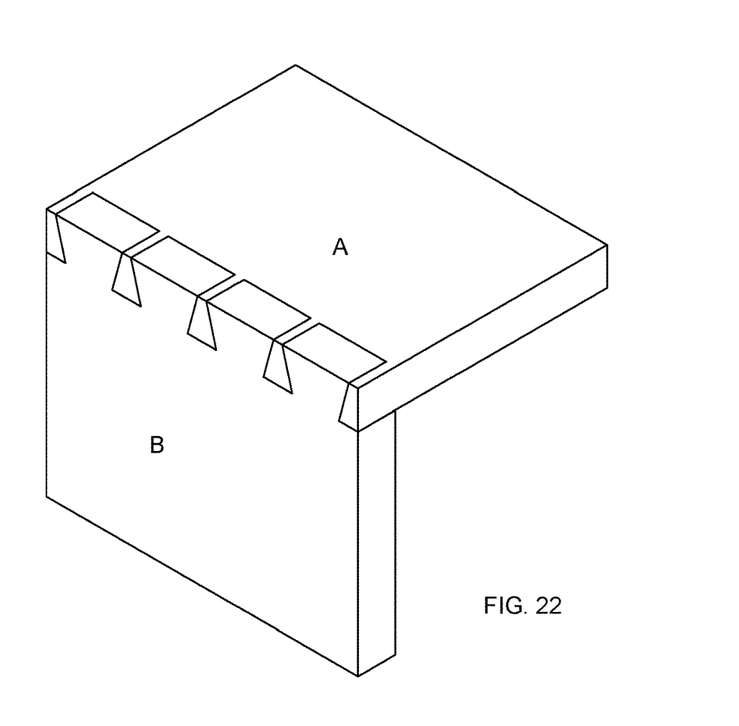
FIG. 22 shows the pin board joined with the tail.

FIG. 21 shows pin board A aligned to fit with tail board B. Board end 64 and board end 56 form the corner of the dovetail joint. Board end 64 couples with pin straight end 54, and board end 56 couples with tail straight end 66, which is positioned on tail board B. FIG. 22 shows the completed dovetail joint with pin board A fitted with tail board B.

I hereby claim:

1. A handheld jig for marking or cutting a tail board of a dovetail joint comprising:
    a base that may be held in the hand of a user,
        wherein the base includes an angled planar surface extending outwardly from the base, wherein the angled planar surface serves as a guide for marking or cutting the tail board when the base is aligned on top of a edge of the tail board,
        wherein the base includes a retractable arm, wherein the retractable arm includes a flat surface that is positioned against a cut on a pin board of the dovetail joint, wherein the placement of the flat surface of the retractable arm positions the angled planar surface on top of the tail board so that the tail board may be marked or cut to form the dovetail joint,
    wherein the angled planar surface includes at least one magnet that contacts a saw when cutting the tail board.

2. The device of claim 1 wherein the jig further comprises:
    a second angled planar surface extending outwardly from the base, wherein the second angled planar surface serves as a guide for marking or cutting a pin board when the base is aligned on top of a edge of the pin board, wherein the second angled planar surface includes at least one magnet that contacts a saw when cutting the pin board.

3. A handheld jig for marking or cutting a tail board of a dovetail joint comprising:
    a base that may be held in the hand of a user,
        wherein the base includes an angled planar surface extending outwardly from the base, wherein the angled planar surface serves as a guide for marking or cutting the tail board when the base is aligned on top of a edge of the tail board, wherein the base includes a retractable arm, wherein the retractable arm includes a flat surface that is positioned against a cut on a pin board of the dovetail joint, wherein the placement of the flat surface of the retractable arm positions the angled planar surface on top of the tail board so that the tail board may be marked or cut to form the dovetail joint, wherein a screw is screwed into the base, wherein the depth that the retractable arm retracts within the base is set by adjusting the depth that the screw is screwed into the base.

4. A method of marking or cutting tail cuts of a dovetail joint comprising:

placing a retractable arm of a handheld jig device onto the side length of a pin cut, wherein the pin cut is positioned onto the top of the edge of a pin board, wherein the pin board is a board with one or more pin cuts that form a pin portion of the dovetail joint, placing an angled planar surface of the handheld jig device onto the top of the edge of a tail board, wherein the tail board is a board with one or more tail cuts that forms a tail portion of the dovetail joint, marking or cutting the top of the edge of the tail board at the point wherein the angled planar surface of the handheld jig device contacts the top of the edge of the tail board.

5. The method of claim 4, further comprising:

placing a second angled planar surface of the handheld jig device onto the top of the edge of a pin board, wherein the pin board is a board is the pin board of the dovetail joint;

marking or cutting the top of the edge of the pin board at the point wherein the second angled planar surface contacts the top of the edge of the pin board.

* * * * *